United States Patent [19]

Gouzos

[11] 4,325,462
[45] Apr. 20, 1982

[54] DEVICE FOR SMALL ANIMAL ESCAPE FROM A POOL

[76] Inventor: John Gouzos, 451 E. Boston Post Rd., Mamaroneck, N.Y. 10543

[21] Appl. No.: 190,516

[22] Filed: Sep. 25, 1980

[51] Int. Cl.³ .......................... E06C 9/00; E04H 3/20; E04H 3/16
[52] U.S. Cl. ..................................... 182/93; 182/129; 182/196; 210/169
[58] Field of Search ............... 182/194, 129, 196, 138, 182/93; 52/169.7, 261, 250, 182; 210/416 AS, 169

[56] References Cited

U.S. PATENT DOCUMENTS

| | | | |
|---|---|---|---|
| 1,786,613 | 6/1928 | Hooper | 182/194 |
| 3,891,053 | 6/1975 | Burton | 182/194 |
| 3,939,505 | 2/1976 | Gross | 210/169 |
| 4,022,690 | 5/1977 | Smith | 210/169 |
| 4,154,679 | 5/1979 | Farage | 210/169 |

*Primary Examiner*—Reinaldo P. Machado
*Attorney, Agent, or Firm*—Pennie & Edmonds

[57] ABSTRACT

A device to permit the escape of small animals from a pool having a walkway border including a ladder arrangement positioned below the walkway border which ladder arrangement provides escape for small animals from the surface of the pool through an escape hole in the walkway border.

2 Claims, 3 Drawing Figures

DEVICE FOR SMALL ANIMAL ESCAPE FROM A POOL

BACKGROUND ART

Artificial pools, including residential and public swimming pools, are constructed with out-of-the-water walkway borders which are positioned substantially above the water level normally maintained in such pools. Because the water level is substantially below the level of the out-of-the-water walkway borders small animals have difficulty, or find it impossible, to escape from the pool.

Present techniques for removal of pool debris including stranded small animals is to recirculate pool water using skimmer systems and deep water pumping. Debris collected in strainers is then removed by hand.

SUMMARY OF THE INVENTION

Broadly, the present invention is a device for installation below the walkway border in a chamber, such as a water collecting housing, adjacent the pool level which device includes a ladder arrangement leading from the water surface through an aperture in the walkway border. The ladder arrangement preferable has its lower end situated in the surface stream of water created by pump recirculation and is so constructed that water can flow through it while providing sufficient structure for small animals to climb onto and upwardly out of the water. The upper end of the ladder arrangement leads to an exit aperture in the walkway border through which the animals can escape.

A DETAILED DESCRIPTION OF THE INVENTION

Figure 1:
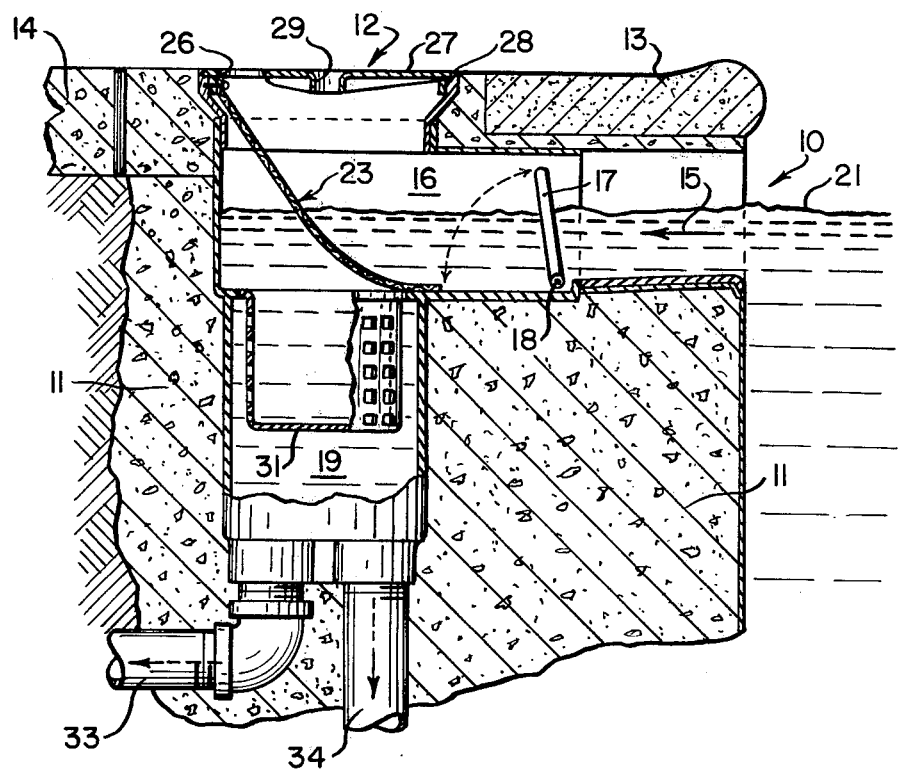
FIG. 1 is a partial elevation sectional view of a swimming pool water collecting housing under the pool walkway border including the device of the present invention.
Figure 2:
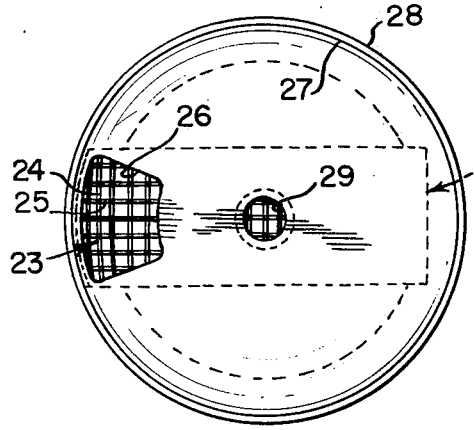
FIG. 2 is a plan view of a removable access port in the housing with an escape aperture in it.
Figure 3:
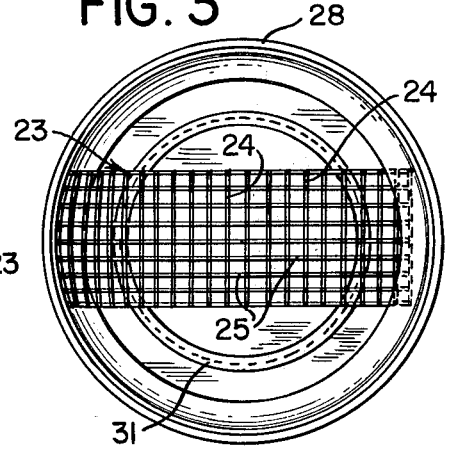
FIG. 3 is plan view of access port with the cover removed showing the escape ladder.

In the Figures, pool 10 includes pool side wall 11, pool border walkway 12 which includes pool lip 13 and pool border extension 14. Under pool walkway border 12 is water recirculation collector housing or chamber 16 in which water is drawn from the surface of the pool for filtering, heating and other treatment. Water is drawn into housing 16 in the direction of arrow 15 past weir 17 which is pivotable about axle 18 by the suction of a pump (not shown) pulling water out of sump 19. Weir 17, shown in its up position, rotates counterclock-time to a position just below the water line 21 when water is pulled by the pump. Weir 17 creates more rapid movement of the water nearest the surface of the pool.

Mesh ladder 23 including lateral and longitudinal strands 24, 25 provides an escape route for small animals to climb out of the water and out escape hole 26. Cover 27 is seated flush in hand hole cover mounting ring 28. Escape hole 26 is large enough for a small animal escape but small enough for human safety as persons move along the pool walkway border. Grip hole 29 in cover 27 permits easy removal and replacement of the cover.

Also shown is debris basket 31 in sump 19 and suction lines 33 and 34 for drawing water from the pool in the directions shown.

Ladder 23 may be made of any material such as steel, aluminum or plastic and may be stiff or pliable provided it does not block the flow of water to the sump and further provided there is presented a surface upon which a small animal can climb. Preferably the lateral width of ladder 23 is such that animals can not be swept around it into sump 19 without the full opportunity to climb it for escape.

I claim:

1. A pool escape device for small animals adapted to be used in pools having a pool walkway border substantially above the water level of the pool and a water chamber positioned below the walkway border which chamber is in communication with the surface of the pool comprising
   (a) ladder means positioned in the water chamber between the water level of the pool and the walkway border, said ladder means having one end near enough to the surface of the pool for small animals to climb onto the ladder means and the ladder means having its other end near enough to the walkway border for small animals to climb from the ladder means to said border; and
   (b) an aperture in the walkway border to permit animals climbing the ladder means to escape therethrough.

2. The pool escape device of claim 1 in which the ladder means is so constructed to permit water to flow therethrough.